| United States Patent [19] | [11] Patent Number: 4,851,458 |
|---|---|
| Hopperdietzel | [45] Date of Patent: Jul. 25, 1989 |

[54] USE OF CELLULOSE FIBERS FOR STRUCTURALLY MODIFYING POLYVINYL CHLORIDE ARTICLES

[75] Inventor: Siegfried Hopperdietzel, Selb, Fed. Rep. of Germany

[73] Assignee: Rehau AG & Co., Rehau, Fed. Rep. of Germany

[21] Appl. No.: 95,148

[22] Filed: Sep. 11, 1987

[30] Foreign Application Priority Data

Sep. 11, 1986 [DE] Fed. Rep. of Germany ....... 3630939

[51] Int. Cl.⁴ .................... C08L 27/06; C08K 7/02; C08K 9/00
[52] U.S. Cl. .................... 523/205; 428/35.6; 524/35; 524/567
[58] Field of Search ............ 524/35; 523/205; 428/35, 36, 35.6

[56] References Cited

U.S. PATENT DOCUMENTS

| | | |
|---|---|---|
| 3,546,158 | 12/1970 | Champion et al. |
| 4,250,064 | 2/1981 | Chandler ................. 524/35 |
| 4,336,299 | 6/1982 | Holst et al. ............. 523/205 |
| 4,339,363 | 7/1982 | Nakagima .............. 524/35 |
| 4,343,727 | 8/1982 | Cohen .................... 524/35 |
| 4,376,144 | 3/1983 | Goettler ................. 524/35 |
| 4,405,730 | 9/1983 | Cohen .................... 524/35 |
| 4,481,075 | 11/1984 | Dailly et al. ........... 428/288 |
| 4,551,294 | 11/1985 | Wottka et al. ........ 524/35 |
| 4,612,251 | 9/1986 | Fredenucci et al. ..... 428/511 |

FOREIGN PATENT DOCUMENTS

| | | |
|---|---|---|
| 0138121 | 4/1985 | European Pat. Off. ............. 524/35 |
| 999788 | 2/1952 | France . |
| 1167665 | 11/1958 | France . |
| 1475828 | 4/1967 | France . |
| 2036872 | 12/1970 | France . |

OTHER PUBLICATIONS

RD-246002 Abstract Oct. 10, 1984, Anonymous, Derwent, 84-286412/46.

*Primary Examiner*—Herbert J. Lilling
*Attorney, Agent, or Firm*—Spencer & Frank

[57] ABSTRACT

Use of cellulose fibers of natural origin as an admixture to polyvinyl chloride is disclosed. Structurally modifying a polyvinyl article by admixing cellulose fibers limits heat shrinkage thereof and results in improved surface characteristics and/or mechanical characteristics. A polyvinyl article is provided which is comprised of polyvinyl chloride and from 1 to 40 wt. %, preferably from 3 to 20 wt. %, cellulose fibers having a fiber thickness ranging from a finite thickness to about 40 $\mu$m and a fiber length ranging from twice the fiber thickness to about 400 $\mu$m, preferably from about 80 $\mu$m to about 400 $\mu$m.

12 Claims, No Drawings

USE OF CELLULOSE FIBERS FOR STRUCTURALLY MODIFYING POLYVINYL CHLORIDE ARTICLES

BACKGROUND OF THE INVENTION

1. Field of the Invention

The present invention relates to the use of cellulose fibers of natural origin for structurally modifying polyvinyl chloride (PVC) articles, such as bands and profiles, and to such articles.

2. Description of the Related Art

The use of cellulose fibers of natural origin as fillers is known in the polymer processing industry. These are highly pure, white powders or fibers having a cellulose content of at least 99.5% with reference to the dry substance. Such cellulose fillers are distinguished by defined bulk weights which ensure optimum incorporation into the basic substance of the composition to be processed. The cellulose fillers are not abrasive and are substantially inert to acids, bases and solvents.

Cellulose filers may be admixed with particular advantage in flowable polymer-based compositions because the manufacturing process employed for such compositions ensures optimum anchorage of the individual fibers which have a fibrillar surface. The fibers are obtained from wood which has been appropriately comminuted and chemically cleaned or lignin and other impurities. Following the cleansing process, the cellulose raw material is ground into a variety of fiber lengths.

In the production of articles made of polyvinyl chloride, particularly band and profile articles, considerable shrinkage is known to occur if these articles are subjected to use at elevated temperatures. In a test at 11° C. for one hour, shrinkage on the order of 2 to 4% of the original length is not unusual. Such shrinkage, particularly a reduction in the length of elongate articles, is a major drawback to use of polyvinyl chloride and renders polyvinyl chloride articles unacceptable for use in many applications. Although the use of special polymer process tools has made it possible to reduce shrinkage to about 1.5%, this shrinkage value is still too high for many applications.

The use of admixed fillers in processing polyvinyl chloride is known. Fillers which have been employed include particulate fillers, such as calcium carbonate and the like. However, the shrinkage behavior of polyvinyl chloride band and profile articles has been improved only somewhat by such fillers.

If wood meal is used as a filler for polyvinyl chloride, a reduction of shrinkage is realized, but impact strength is considerably reduced thereby. Moreover, the surface quality of band and profile articles composed of polyvinyl chloride charged with wood meal as a filler no longer meets the respective product requirements. Further, such bands and profiles are discolored by the wood meal and are therefore subject to use restrictions since discoloration is not tolerated for many applications.

If glass fibers are used as fillers in the production of polyvinyl chloride band and profile articles a great drop in impact strength results and the bands and profiles have an open, rough surface which is not tolerated in many applications. Moreover, a further drawback in the use of glass fibers as filler is that they cause increased wear of the tools used in the manufacture of the filled articles and also in subsequent processing of the articles.

SUMMARY OF THE INVENTION

It is an object of the present invention to provide a filler for polyvinyl chloride compositions to be processed into articles, particularly bands and profiles, which limits the shrinkage of such articles when subjected to use at elevated temperatures without adversely affecting the color, surface characteristics or mechanical characteristics, such as impact strength, of the articles.

It is a further object of the present invention to provide a filler for polyvinyl chloride compositions to be processed into articles, particularly bands and profiles, which improves the surface characteristics and/or the mechanical characteristics of the articles.

DESCRIPTION OF THE PREFERRED EMBODIMENTS

These objects are accomplished by providing a polyvinyl chloride article, particularly a band or profile article, composed of polyvinyl chloride and from 1 to 40 wt. %, preferably 3 to 20 wt. %, cellulose fibers of natural origin as a structural modifier effective to limit heat shrinkage of the article, the cellulose fibers having a fiber thickness ranging from a finite thickness to about 40 $\mu$m and a fiber length ranging from about 40 $\mu$m to about 400 $\mu$m, preferably from about 80 $\mu$m to about 400 $\mu$m.

These objects are additionally accomplished by the process of structurally modifying a polyvinyl chloride article to limit heat shrinkage thereof, which process includes admixing from 1 to 40 wt. %, preferably from 3 to 20 weight %, cellulose fibers of natural origin in polyvinyl chloride and forming an article therefrom, the cellulose fibers having a fiber thickness ranging from a finite thickness to about 40 $\mu$m and a fiber length ranging from about 40 $\mu$m to about 400 $\mu$m, preferably from about 80 $\mu$m to about 400 $\mu$m.

Polyvinyl chloride bands and profiles filled with cellulose of natural origin within the compositional limitations according to the invention exhibit shrinkage which is negligibly low and lies well below 1 % when heat treated at 110° C. for one hour. This is a very significant advantage compared to prior art polyvinyl chloride articles. Further, the filler fibers according to the invention have a soft consistency which provides bands and profiles filled there with an improved surface and permits any type of further processing, such as lacquer coating of the articles, etc. The high degree of whiteness of the cellulose fibers causes no interference with the color of the bands and profiles filled with this filler. Moreover, no interference with color is noted if bands and profiles provided with this filler are dyed or pigmented during the article forming process by adding dyes or pigments to the thermoplastic polyvinyl chloride-based composition to be molded or extruded.

Cellulose fiber-filled polyvinyl chloride bands and profiles have improved mechanical characteristics, including a good notched bar impact tensile strength so that these bands and profiles are resistent to splintering, for example, during further mechanical processing.

The article according to the invention may have any shape, however, the advantages of the invention are most pronounced when the articles are elongated articles, such as bands and profiled strips. The term "bands" as used herein refers to flat narrow-strips having surfaces with parallel or roughly parallel sides. The term "profiles" as used herein is intended to include all profiled objects, such as full profiles, hollow profiles, tubes, etc.

Although the fibrillar surface of the individual fibers produces very good adhesion of the fibers to the polymer-based composition since the manufacturing process uses a flowable, thermoplastic polymer composition which flows and surrounds the individual fibrils, it may be of advantage in certain fields of application to increase this adhesion by application of an adhesion promotor to the fibers prior to incorporation thereof into the polymer. The cellulose fibers may be coated with an adhesion promotor before they are admixed within the mixing ranges according to the invention. The adhesion promoter may be applied to the fibers, for example, by spraying. In individual cases, it may be necessary to subject the fibers to an additional grinding process after such a spray application. Example of materials useful as adhesion promoters include a dispersion of PMMA manufactured by Rohm and Haas, distributed under the trade name PRIMAL. Useful amounts of adhesion promoters range from a finite amount equal to the weight of the cellulose fibers.

Natural cellulose fibers having a length ranging up to 400 μm are useful in the invention. The 400 μm limit is an empirical value determined by experiments in which it was found that fibers with greater lengths knotted together when mixed into the thermoplastic polymer composition and formed thickened portions which were noticeable on the surface of the formed bands and profiles. Such knots result in undesirable surface characteristics and cannot be eliminated in the mixing processes customarily used in large-scale plastic processing.

The following examples demonstrate the particularly favorable characteristics of articles according to the invention in comparison with articles employing other fillers.

EXAMPLE 1

An extruded band was produced having a width of 23 mm, and a wall thickness of 3 mm. Such extruded bands are used in the furniture industry to define edge bands of for example, furniture sheets. The following composition according to the invention was employed and the ingredients, including the cellulose fibers, were mixed in a rapid mixer customarily used in the art.
  100 parts by weight of a suspension of PVC having a K-value of 65;
  2 parts by weight lead stabilizer;
  1.5 parts by weight sliding agent mixture;
  2 parts by weight polymethyl methacrylate powder as a flow enhancer;
  35 parts by weight cellulose filler having an average fiber diameter of 15 μm and, for 99 % of the fibers, a fiber length of less than 150 μm; and
  0.15 parts by weigh of insoluble color pigment.

The extruded band had a matte, closed surface. A shrinkage test was performed by heat treating the extruded band at 110° C. for one hour and yielded a shrinkage value of 0.3 %. The notched bar impact tensile strength was determined to be 45 KJ/m$^3$ according to German Industrial Standard DIN 53448. The finished band was suitable for direct delivery to the furniture industry without further processing because of these optimum characteristics.

EXAMPLE 2

An extruded band was produced and tested according to Example 1, except that the cellulose filler was replaced by the same quantity of wood meal having a particle length of 150 μm.

Although the shrinkage test for this extruded band yielded a shrinkage of 0.6 %, the surface of the band was rough and scaly. Moreover, the brownish color of the wood meal caused a great shift in the color of this article so that light hues could no longer be obtained as required, for example, by the furniture industry. The notched bar impact tensile strength was determined to be 27 KJ/cm$^3$, which is considerably lower than that obtained in Example 1.

EXAMPLE 3

The cellulose fibers of Example 1 were used in a different formulation for profiles which, in addition to low shrinkage, must also meet high surface quality requirements. The following composition according to the invention was employed:
  100 parts by weight of an emulsion of PVC having a K-value of 65;
  1.2 parts by weight tin stabilizer;
  2.8 parts sliding agent mixture;
  1.2 parts by weight polymethyl methacrylate powder as a flow enhancer;
  5 parts by weight cellulose filler;
  0.15 parts by weight of insoluble color pigment; and A band profile was produced having a width of 24 mm and a wall thickness of 2 mm. The band profile resulting from the manufacturing process had a satiny, smooth, closed surface and a perfect color match compared to a formulation without cellulose fibers. The high degree of whiteness of the cellulose fibers employed had practically no coloring influence on the resulting band profile.

Shrinkage after heat treatment at 110° C. for 1 hour was determined to be 0.7 %. The notched bar impact tensile strength according to DIN 53338 was 96 KJ/m$^3$. This band profile thus has characteristics making it suitable for shipment without further processing and without any further expense.

EXAMPLE 4

A band profile was produced which had the same dimensions as in Example 3, but a composition having a particulate filler was employed instead of one having cellulose fibers as filler. The following composition was used:
  100 parts by weight of an emulsion of PVC having a K-value of 65;
  1.2 parts by weight tin stabilizer;
  2.8 parts by weight sliding agent mixture;
  1.2 parts by weight polymethyl methacrylate powder as a flow enhancer; and
  7 parts by weight calcium carbonate of an average grain size of 3 μm.

The extruded profile had a matte surface. When tested for shrinkage after heat treating at 110° C. for one hour a shrinkage value of 2.3 resulted. The notched bar impact tensile strength according to DIN 53448 was determined to be 99 KJ/m$^3$.

EXAMPLE 5

A particularly impact resistant, modified, hard polyvinyl chloride was employed as the basic polymer substance, as is often used in the processing industry. The mixing process and the extruded band dimensions were identical to those in Example 1. The following composition was employed:

- 92 parts by weight of a suspension of PVC having a K-value of 65;
- 8 parts by weight methacrylate butadiene styrene polymer as the impact strength component;
- 2 parts by weight lead stabilizer;
- 1.8 parts by weight sliding agent mixture;
- 1 part by weight polymethyl methacrylate as flow enhancer: and
- 18 parts by weight cellulose fibers with 99 % having a fiber length distribution of less than 250 μm and a fiber diameter of about 25 μm.

The extruded profile had a matte, closed surface. When tested for shrinkage after heat treating at 110° C. for one hour, a value of 0.4 resulted. The notched bar impact tensile strength according to DIN 53448 was determined to be 140 KJ/m$^3$.

In examples 1, 2, 5 and 6 the PVC employed is VESTOLIT - S manufactured by HUELS AG, which is a free-flowing powder of PVC-homopolymeric resin with a bulk-density of 500 g/l and a monomeric content less than 1.0 ppm.

In examples 3 and 4 the PVC is VESTOLIT - E manufactured by HUELS AG, which is a free-flowing powder of PVC-homopolymeric resin produced by emulsion polymerization process with bulk density of 590 g/l and a monomeric content less than 3.0 ppm.

EXAMPLE 6

This example serves to demonstrate that even a high dosage of particulate non-fibrous fillers, occasionally recommended to reduce heat shrinkage, is only slightly effective for reducing heat shrinkage.

An extruded band was produced according to Example 1, however, the following composition was employed:

- 92 parts by weight of a suspension PVC having a K-value of 65;
- 8 parts by weight methacrylate butadiene styrene polymer as the impact strength component;
- 2 parts by weight lead stabilizer;
- 1.8 parts by weight sliding agent mixture;
- 1 part by weight polymethyl methacrylate as flow enhancer; and
- 40 parts calcium carbonate filler of an average particle size of 3 μm.

The extruded band profile had a closed surface. When tested for shrinkage after heat treating at 110° C. for one hour, a value of 2.2 % resulted. The notched bar impact tensile strength according to DIN 53448 was determined to be 145 KJ/m$^3$.

In summary it can be noted that particulate fillers, such as calcium carbonate, produce merely a slight improvement in shrinkage values. If wood meal is used as the filler, it is possible, in principle, to reduce the shrinkage of polyvinyl chloride bands and profiles; however, the notched bar impact tensile strength is reduced considerably. Also, the inherent coloration of this filler results in an unacceptable coloration of the filled article.

Glass fibers used as filler have the great disadvantage of a considerable drop in notched bar impact tensile strength and have a rough surface with the concomitant increased wear on tools.

The present disclosure relates to the subject matter disclosed in Federal Republic Germany Patent Application No. P 36 30 939.0, filed Sept. 11th, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. The process of structurally modifying a polyvinyl chloride article to limit heat shrinkage thereof to below 1% when heat treated at 110° C. for 1 hour without adversely affecting the color, surface characteristics, or mechanical characteristics thereof, comprising:
   admixing from 1 to 40 wt. % cellulose fibers of natural origin in polyvinyl chloride; and
   forming an article therefrom, the cellulose fibers of natural origin comprising, after chemical cleansing and communiting, at least 99.5% cellulose and having a fiber thickness ranging from a finite thickness to about 40 μm and a fiber length ranging from about 40μm up to about 400 μm.

2. The process according to claim 1, wherein from 3 to 20 wt. % cellulose fibers of natural origin are admixed.

3. The process according to claim 2, wherein the cellulose fibers are coated with an adhesion promoter prior t being admixed with polyvinyl chloride.

4. The process according to claim 1, wherein the cellulose fibers are coated with an adhesion promoter prior to being admixed with polyvinyl chloride.

5. The process according to claim 1, wherein the polyvinyl chloride article is a band or profile.

6. A polyvinyl chloride article, comprising:
   polyvinyl chloride; and
   from 1 to 40 wt. % cellulose fibers of natural origin as a structural modifier effective to limit heat shrinkage of the article to below 1% when heat treated at 110° C. for 1 hour without adversely affecting the color, surface characteristics, or mechanical characteristics thereof, the cellulose fibers of natural origin comprising, after chemical cleansing and communiting, at least 99.5% cellulose and having a fiber thickness ranging from a finite thickness to about 40 μm and a fiber length ranging from about 40 μm up to about 400 μm.

7. The polyvinyl chloride article according to claim 6, wherein the polyvinyl chloride article comprises from 3 to 20 wt. % cellulose fibers of natural origin.

8. The polyvinyl chloride article according to claim 7, further comprising an adhesion promoter coated onto the cellulose fibers prior to admixing the cellulose fibers into the polyvinyl chloride.

9. The polyvinyl chloride article according to claim 6, further comprising an adhesion promoter coated onto the cellulose fibers prior to admixing the cellulose fibers into the polyvinyl chloride.

10. The polyvinyl chloride article according to claim 6, wherein the polyvinyl chloride article is a band or 11. The process according to claim 1, wherein the fiber length ranges from about 80 μm to about 400 μm.

12. The polyvinyl chloride article according to claim 6, wherein the fiber length ranges from about 80 μm to about 400 μm.

* * * * *

UNITED STATES PATENT AND TRADEMARK OFFICE
CERTIFICATE OF CORRECTION

PATENT NO. : 4,851,458
DATED : Jul 25, 1989
INVENTOR(S) : Siegfried Hopperdietzel It is certified that error appears in the above-identified patent and that said Letters Patent is hereby corrected as shown below: On the title page;

Please change [30] prior application No. "3630939" to --3630937--.

Signed and Sealed this

Third Day of July, 1990

*Attest:*

HARRY F. MANBECK, JR.

*Attesting Officer*      *Commissioner of Patents and Trademarks*